Patented July 22, 1924.

1,502,501

UNITED STATES PATENT OFFICE.

ANTONI GUMOWSKI, OF CAMDEN, NEW JERSEY.

WATERPROOF BRICK.

No Drawing.   Application filed August 1, 1922.   Serial No. 579,058.

*To all whom it may concern:*

Be it known that I, ANTONI GUMOWSKI, a citizen of Poland, residing at Camden, in the county of Camden and State of New Jersey, have invented certain new and useful Improvements in Waterproof Bricks, of which the following is a specification.

This invention relates to certain new and useful improvements in waterproof brick and also has reference to the method of producing the same.

The primary object of the invention resides in the provision of a waterproof brick wherein the brick that is formed of cementitious or argillaceous material is either sundried or baked in a kiln with the desired exposed faces of the brick dipped or immersed into a waterproofing solution such as shellac or varnish and thereafter allowed to set and dry, the shellac or varnish coating tending to harden the treated surfaces of the brick and also partially permeating the brick for purposes of rendering the exposed faces thereof waterproof.

The manner of reducing the invention to practice is hereinafter specifically set forth, and the article and method of producing the same are only limited by the subject matter claimed.

In manufacturing the waterproof brick disclosed in this application, said brick may be formed either of a cementitious or argillaceous material, the brick when formed of cement as a basis, being preferably sundried, while argillaceous bricks are baked in a kiln. After the bricks are formed and thoroughly dried, desired faces thereof such as are intended to be exposed to the elements when the bricks are employed in buildings, are dipped or immersed in a waterproofing solution, such as shellac or varnish, the waterproofing solution partially permeating the brick adjacent the dipped faces for purposes of toughening or hardening the exposed surfaces of the brick and also rendering the same substantially waterproof. The bricks are then allowed to thoroughly dry and are ready for immediate use.

What is claimed as new is:—

As an article of manufacture, a brick having at least one of its faces waterproof, such face having a shellac coating thereon with the shellac coating partially permeating the brick at such face to produce the waterproof characteristic.

In testimony whereof I affix my signature.

ANTONI GUMOWSKI.